Figure 1:
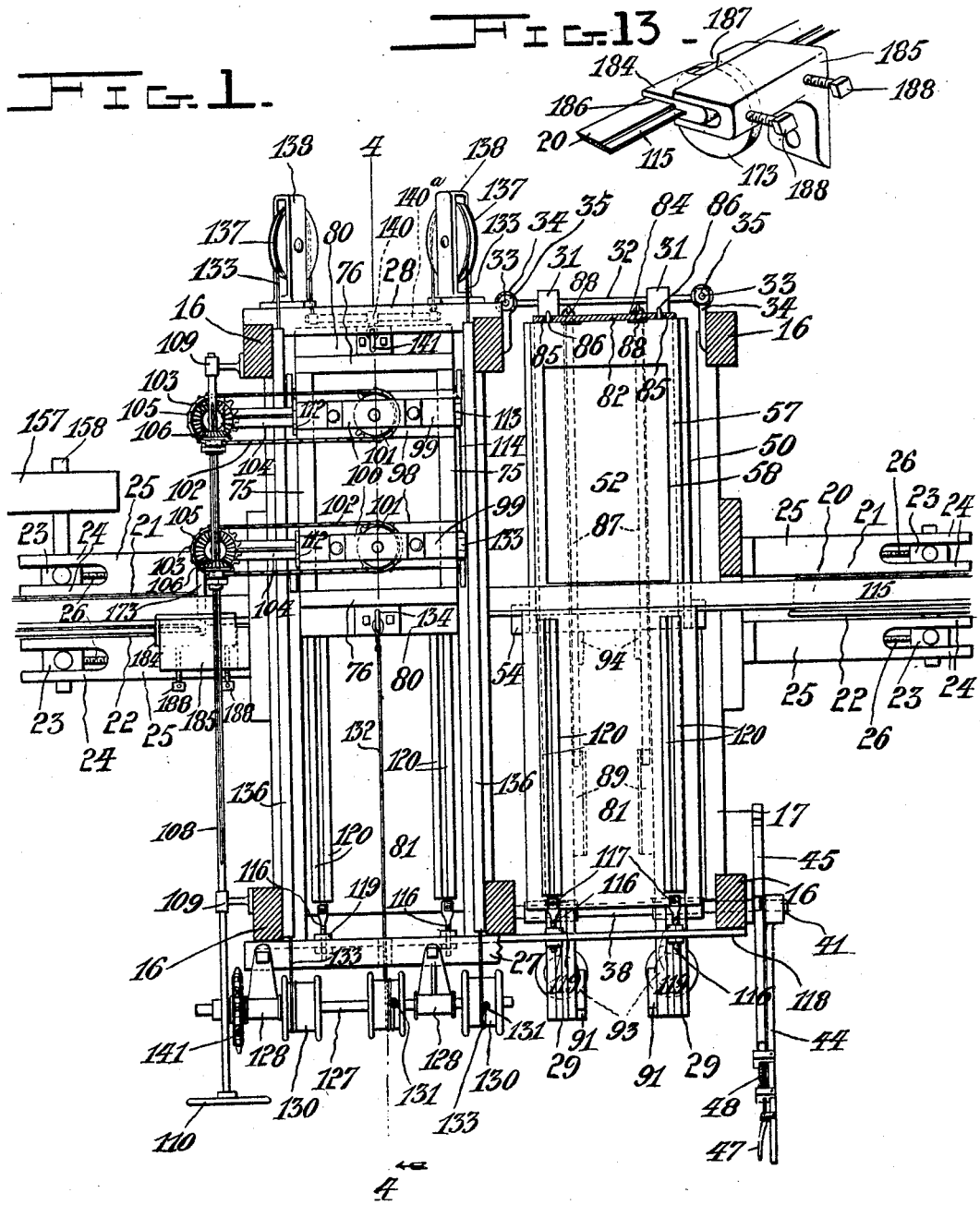

No. 794,969. PATENTED JULY 18, 1905.
P. BELLE.
PROCESS OF MAKING PASTED LEATHER STOCK.
APPLICATION FILED MAR. 25, 1903.

7 SHEETS—SHEET 1.

Witnesses:
John T. Deufferwiel
George W. Collen

Philias Belle, Inventor,
By Marion & Marion
Attorneys

No. 794,969. PATENTED JULY 18, 1905.
P. BELLE.
PROCESS OF MAKING PASTED LEATHER STOCK.
APPLICATION FILED MAR. 25, 1903.

7 SHEETS—SHEET 2.

Witnesses: Philias Belle, Inventor,
By Marion & Marion
Attorneys

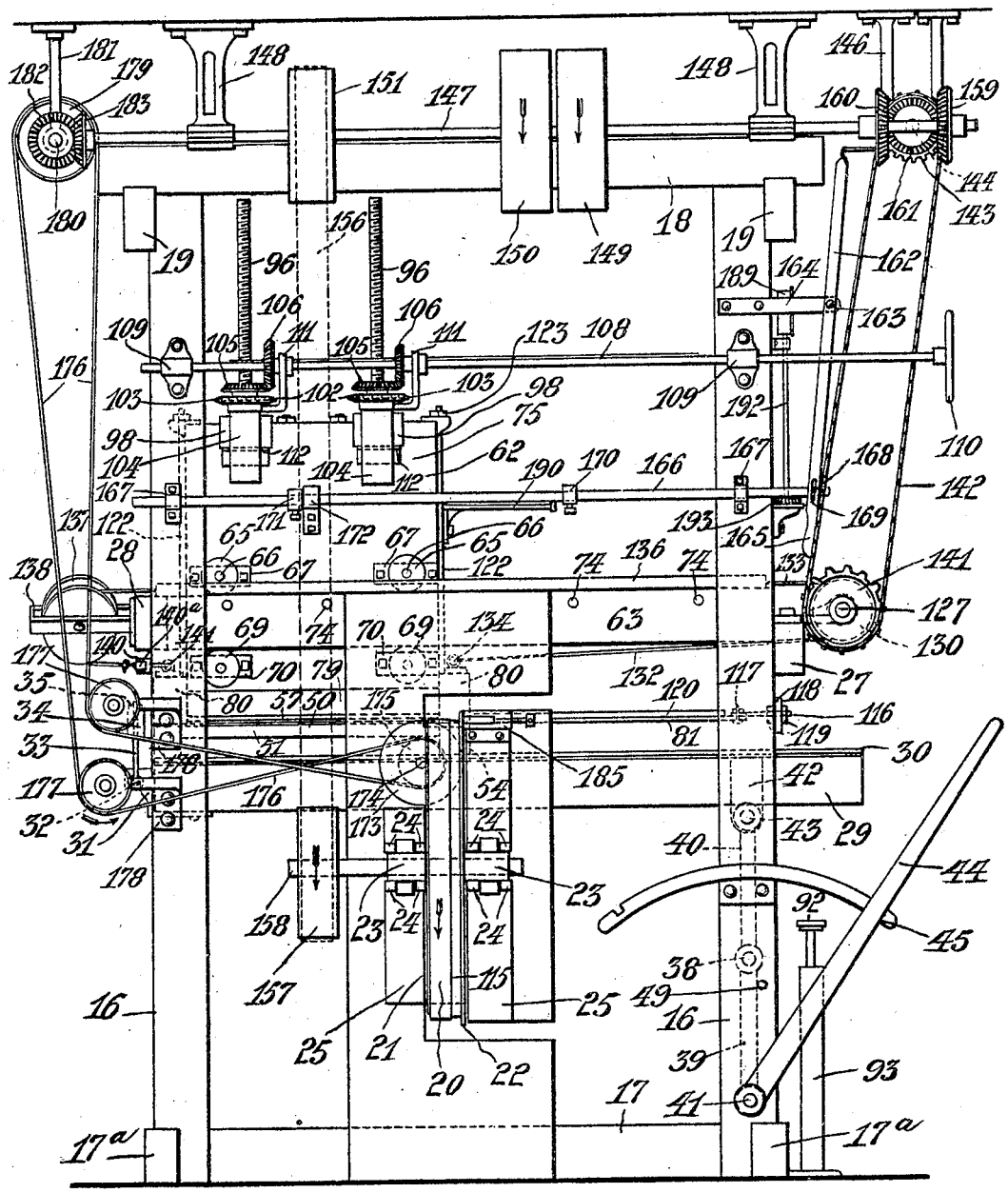

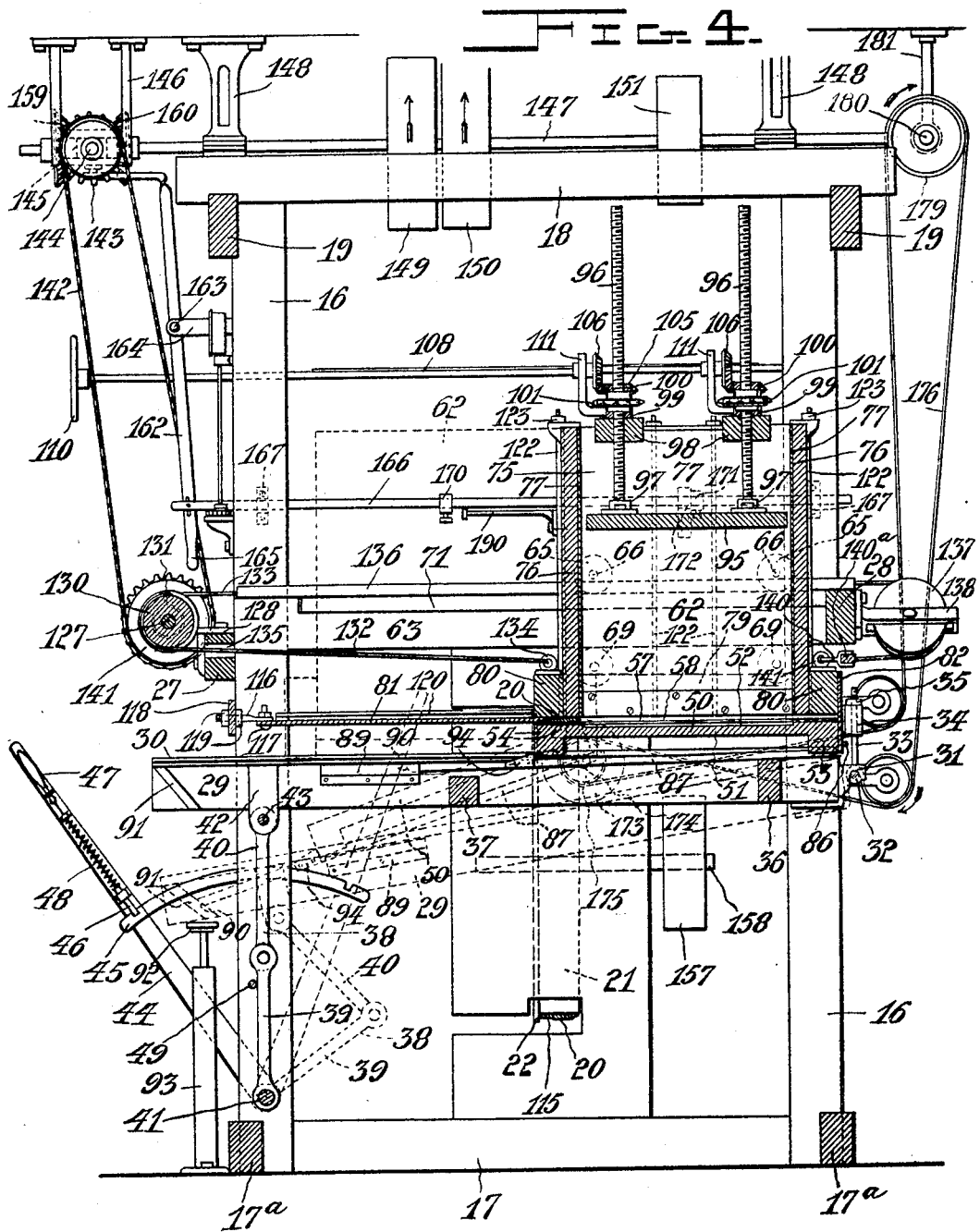

No. 794,969. PATENTED JULY 18, 1905.
P. BELLE.
PROCESS OF MAKING PASTED LEATHER STOCK.
APPLICATION FILED MAR. 25, 1903.
7 SHEETS—SHEET 5.
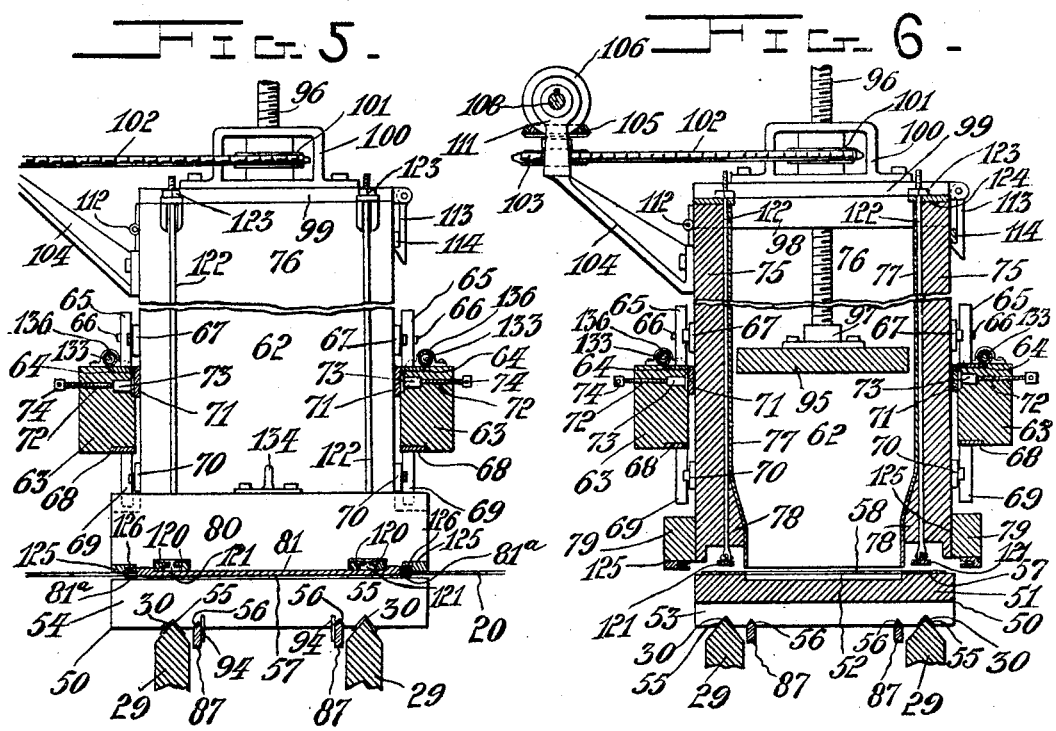
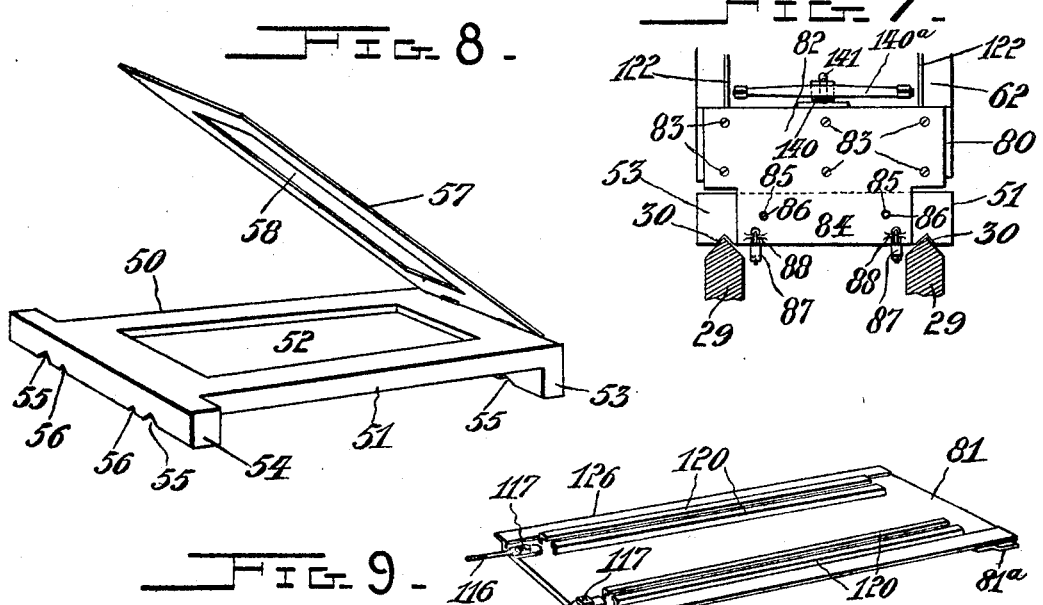
Witnesses: Philias Belle, Inventor,
By Marion & Marion
Attorneys.

No. 794,969. PATENTED JULY 18, 1905.
P. BELLE.
PROCESS OF MAKING PASTED LEATHER STOCK.
APPLICATION FILED MAR. 25, 1903.
7 SHEETS—SHEET 6.
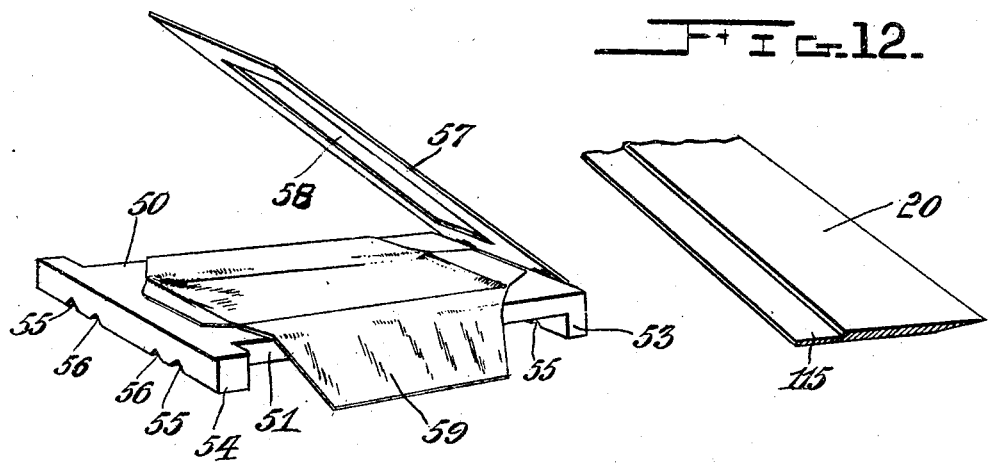
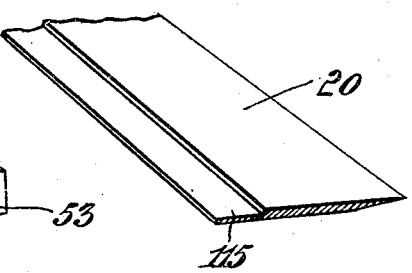
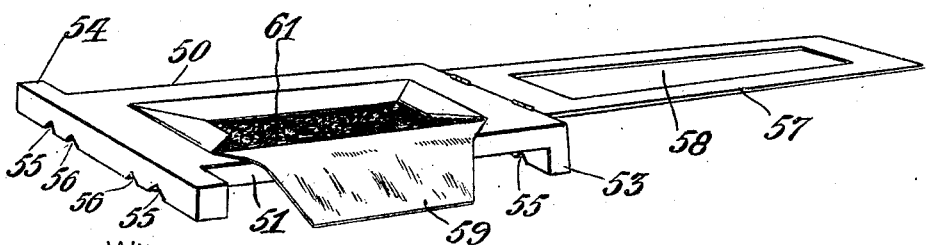
Witnesses:
Philias Belle, Inventor,
By Marion & Marion
Attorneys No. 794,969. PATENTED JULY 18, 1905.
P. BELLE.
PROCESS OF MAKING PASTED LEATHER STOCK.
APPLICATION FILED MAR. 25, 1903.
7 SHEETS—SHEET 7.
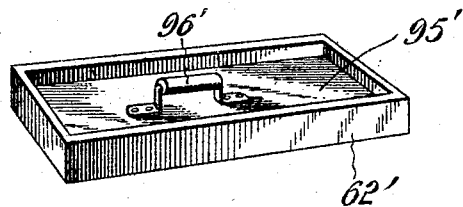
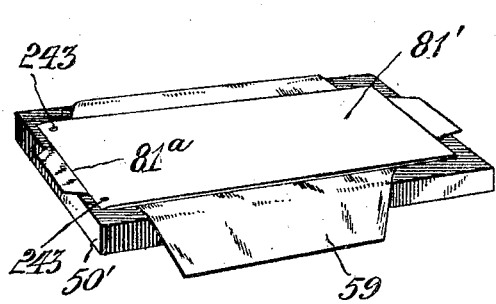
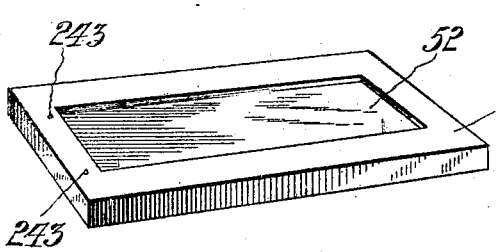
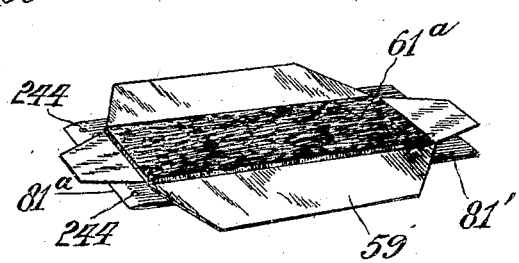
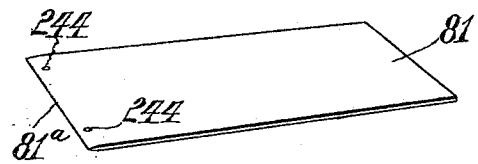
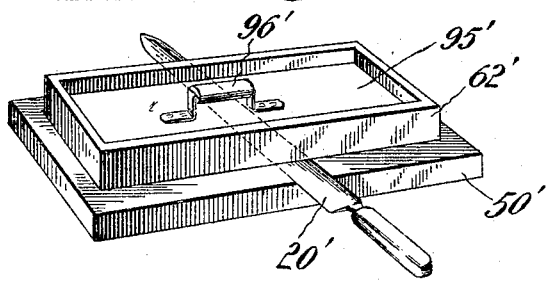
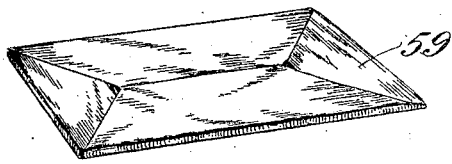
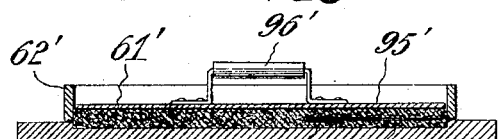
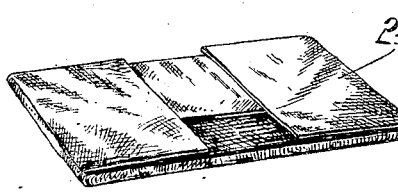
Witnesses:
Philias Belle, Inventor,
By Marion & Marion
Attorneys No. 794,969. Patented July 18, 1905.

UNITED STATES PATENT OFFICE.

PHILIAS BELLE, OF MONTREAL, CANADA.

PROCESS OF MAKING PASTED LEATHER-STOCK.

SPECIFICATION forming part of Letters Patent No. 794,969, dated July 18, 1905.

Application filed March 25, 1903. Serial No. 149,601.

*To all whom it may concern:*

Be it known that I, PHILIAS BELLE, a subject of the King of Great Britain, residing at Montreal, in the county of Hochelaga, Province of Quebec, Canada, have invented a certain new and useful Process of Making Pasted Leather-Stock; and I do hereby declare that the following is a full, clear, and exact description of the invention, such as will enable others skilled in the art to which it appertains to make and use the same.

My invention relates to a process for making what is known in the trade as "pasted leather-stock"—that is to say, a composition which is made in the form of sheets adapted for cutting the soles, particularly the insoles, of shoes and being composed of small leather scraps in a fibrous or strip condition compounded and solidified by means of paste or glue. Heretofore large quantities of this stock have been made by hand from waste materials, the same being compacted in a frame, pounded to render the same homogeneous, and thereafter placed under heavy hydraulic pressure until partially or wholly dried, thus producing a very solid and fairly good wearing material, which has sufficient body and cohesive force to adapt it for insoles and other like uses where the best quality of leather is not required. The process, however, of making this stock as at present carried on is very defective for several reasons. In the first place, it takes a large amount of time; in the second place, it is an extremely-uncleanly operation, as it involves the pounding of the paste and leather composition by rollers which are operated by hand, and the paste necessarily is spattered over the persons of the operatives. Furthermore, the stock even when completed has a tendency to unevenness and irregular and varying quality, due to the varying amount of labor and skill expended in the pounding operation by the different operatives.

It is the object of my present invention to dispense especially with the pounding operation and to perform the operation of filling the mold and compressing the material therein in such manner that it may be rapidly performed and that it may embody a minimum of skill and be particularly adapted for embodiment in an automatic machine, although the process is capable of being also carried out by hand, and, further, of producing a greater and more uniform degree of compression and distribution of the material whereby the finished product is improved.

My process consists in its essential elements in filling the mold, compressing either partially or wholly the stock placed therein, and finally as it becomes sufficiently and regularly compressed passing a knife immediately above the mold, and thus severing the superfluous portion of the stock which overfills the mold and conveying the latter away for use over again. The superfluous material thus "sliced away," so to speak, from the material filling the mold leaves a smooth and even surface and by consequence a sheet of regular thickness and density. The subsequent processes consist in folding a sheet of thin material, such as skived leather or paper, over the partially-compressed sheet, removing it from the mold, and placing it under heavy pressure in a hydraulic or other press until ready for use.

Although various machines may be adapted to carry out my process, the present application is limited to the process itself; but I have shown herein the preferred embodiment of a machine for carrying out the process, in which the raw material, consisting of a mixture of paste and leather scraps suitably comminuted, is compressed by a fixed pressure before and during the action of the slicing-knife. In the embodiment of my invention as herein shown the slicing-knife comprises an endless or band knife which is moved continuously in one direction over pulleys rotated at a rapid rate and located at opposite sides of the machine. I also employ a pair of parallel ways or tracks, supported on heavy beams, which bear the weight of the pressure brought upon the material, which beams are pivoted at one end and may be raised or lowered by mechanical connections, such as a toggle-joint, at the other end, and I arrange the mold to travel on these ways. Immediately above the mold is located the press above alluded to, and one lap of the slicing-knife is caused to pass immediately over the mold, the mold being slid along the ways at right angles to the knife during the cutting process, while at the back of the knife is located a plate which covers the mold and supports the material yet in the press which has been sliced away from the mold by the action of the knife. In order to further bring out the essential elements of my process, I have also shown simple means for carrying it out by hand.

My improved process will best be understood from the following description of the machines devised by me for carrying it out, which are illustrated in the accompanying drawings, in which—

Figure 2:
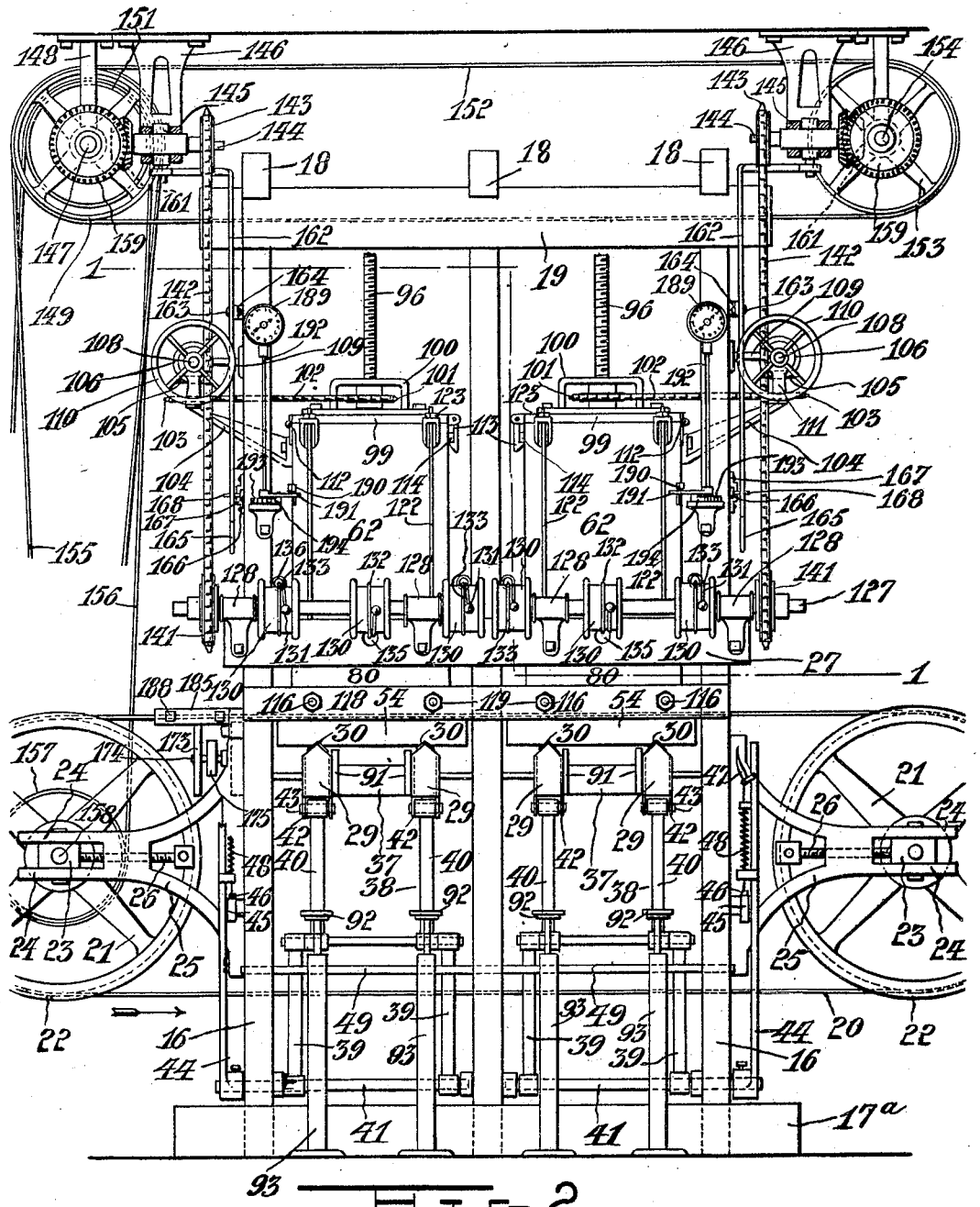

Figure 1 is a plan section of a double machine of the first form above referred to, the section being taken on the line 1 1 of Fig. 2. Fig. 2 is a front elevation of the same machine as that shown in Fig. 1. Fig. 3 is a side elevation of the same from the left-hand side. Fig. 4 is a longitudinal central section through one of the machine units shown in Fig. 1—that is to say, on the line 4 4 of Fig. 1. Fig. 5 is a front elevation of the press-box shown *in situ*, the supporting parts being shown in section. Fig. 6 is a vertical transverse section of the same. Fig. 7 is an enlarged detail rear elevation of the lower part of the press-box and mold, showing the mechanism for locking the latter in place. Fig. 8 is a perspective view of the mold. Fig. 9 is a similar view of the division-plate. Figs. 10 and 11 are perspective views of the mold, showing the manner of handling the present stock. Fig. 12 is a perspective sectional view of the slicing-knife. Fig. 13 is a perspective view of a detail, showing the knife-guide for the grinding-wheel. Figs. 14 to 22 show simple means for carrying out my process by hand and the several successive steps of the process, and of these Fig. 14 is a perspective view of a molding-box and cover-plate. Fig. 15 is a similar view of a plain mold adapted to be used with the molding-box and cover-plate shown in Fig. 14. Fig. 16 is a similar view of a division-plate. Fig. 17 is a similar view showing the operation of cutting the sheet. Fig. 18 is a longitudinal vertical section of the parts as shown in Fig. 17. Fig. 19 is a perspective view showing the operation of removing the molded sheet from the mold. Fig. 20 is a similar view showing the same removed and ready to be wrapped. Fig. 21 is a similar view of the finished sheet after being wrapped, and Fig. 22 is a similar view of the sheet when wrapped in an outer covering according to my process for the press.

In carrying out my invention I preferably arrange a frame comprising corner-posts 16, resting on a pair of horizontal longitudinal beams 17 and transverse beams 17ª and joined together at the top by similar longitudinal beams 18 and transverse beams 19. In the present instance I have illustrated two such units located side by side, the frames being naturally consolidated with each other, and in like manner a series comprising any number of such units may be located side by side, depending on the size of the plant desired, all of those units being acted on by the same band-knife 20, which traverses them in the manner which will be hereinafter described, and is mounted on a pair of pulleys 21, having each a flange 22 on its forward side, these pulleys being mounted on opposite sides of the set of units in journal-boxes 23, these latter being mounted to slide in longitudinal ways 24, formed on the end of brackets 25, which may be supported by the outside unit, and the journal-boxes 23 are provided with tightening means, such as screws 26, engaging with threaded sockets in the brackets 25, whereby the two pulleys 21 may be forced apart, so as to tighten the band-knife to the requisite extent. The frames of the several units are shown as being provided with additional horizontal beams 27 and 28, located, respectively, at the front and rear for supporting the parts of the machine, and of course it will be understood that such other supports and braces are provided as a good engineering design may require, but which are not of sufficient importance to be illustrated herein.

The band-knife 20, as shown, is so located as to pass transversely and centrally across the several machine units at about the height of three feet or so above the ground, the lower lap of said knife returning directly under the upper lap at a convenient distance, which is immaterial so long as it does not interfere with the operating parts of the machine. Cooperating with the upper lap of the knife are a pair of longitudinal beams 29, which have V-shaped ways 30 formed or mounted on their upper edges. These beams 29 are, as shown, provided with hinge-brackets 31 at their rear ends, which engage over a transverse pintle-rod 32, supported by two or more eyebolts 33, which pass through perforated bracket-lugs 34, secured to the rear of the frame of the machine, and rest therein by means of nuts 35 engaging with their upper ends, whereby the ways 30 may be accurately adjusted to the proper level by manipulating the nuts 35. The pintle-rod 32 acts as a hinge for the beams 29, the pair of which belonging to each unit are suitably joined together by transverse blocks 36 37 to keep the ways parallel with each other. At their front ends the beams 29 are supported upon a pair of toggle-joints 38, each comprising a pair of link members 39 40, the former of which is keyed, as shown, upon a transverse shaft 41, journaled at the lower part of the front pair of posts 16 of the machine, while the upper member 40 of the joint is pivoted to a pair of lugs 42, projecting from the lower side of the beam 29 by means of a pintle 43. The shaft 41 is arranged to project some distance beyond the post 16 at one end and has clamped or otherwise secured thereto a hand-lever 44, which may be oscillated in an arc of a circle and is retained in position by means of a notched quadrant-bar 45, with which engages the bolt 46 of a finger-lever 47, the latter being held in the position shown in Fig. 4 by means of spring 48, this being illustrated merely as a very common construction whereby the hand-lever may be readily engaged and disengaged from the quadrant-bar and thus held in the position in which it is placed. It will be seen that by manipulating the lever 44 the beams 29 may be raised and lowered, the position shown in full lines in Fig. 4 being that in which the toggle-joint 38 is straightened, and the beams consequently raised, the toggle-joint being held in this position by the transverse bar 49, against which the lower members 39 of the toggle-joint rest, being slightly bent forward beyond the central position, as will be readily understood.

The mold (designated as a whole 50) is arranged to slide on the horizontal ways 30 and is of a form somewhat similar to the old form, in which the pasted stock was made by hand, but provided with certain constructions which adapt it to use in my machine. This mold is clearly shown in perspective views in Figs. 8, 10, and 11. It consists of a rigid base-plate 51, provided on its upper side with a rectangular recess 52, concentric with the periphery of said base-plate and formed of the proper size of the finished sheet of stock. At each end the mold is provided with a pair of downwardly-projecting ribs 53 54, respectively at the rear and front ends of the mold, each of these having a pair of V-shaped notches 55, fitted to slide on the ways 30, and a second pair of similar but smaller V-shaped notches 56 between the two notches 55, for the purpose which will be hereinafter described. Hinged to the rear side of the base 51 is a cover-plate 57, which practically entirely covers the upper side of the mold, but has a central rectangular aperture 58, whose edges coincide with those of the recess 52.

The manner in which the mold is operated and the purpose of the cover-plate 57 are well illustrated in Figs. 10 and 11. These figures illustrate equally well the process of forming the pressed material either by hand or by machine. First, a rectangular sheet of skived leather, preferably what is known as a "flesher"—that is to say, a skiving from the flesh side of the leather, which is of little value—or strong paper 59 is taken having sufficient size to cover the bottom of the recess 52 and lap over a considerable distance at each side, as shown in Fig. 10. The corners of the rectangular sheet 59 should be cut away obliquely, as shown, so as to prevent the edges of the folded sheet from lapping over each other, and thus forming an objectionable crease. When the sheet has been laid flat, as shown in Fig. 10, the cover-plate 57 is laid down over it, and the raw stock 61 is then placed in the mold and suitably distributed and compressed either by hand or machine, as the case may be, after which the cover-plate 57 is opened, as shown in Fig. 11, and the loose flaps of the sheets 59 folded over on the upper side of the sheet of stock, as shown. When this is done, the compressed sheet may be taken out and subjected to proper pressure in the hydraulic press, as aforesaid. It is customary to leave the sheets in the hydraulic press for a period of about an hour, after which they are hung up to dry either in a suitable drying-room or in the open air.

The mold 50 is fitted, as aforesaid, to slide on the ways 30, these ways being when raised, as shown in full lines in Fig. 4, in substantially horizontal position. In this position the mold is directly beneath the knife 20 and in contact therewith, the knife 20 being arranged to move transversely in contact with the metal cover-plate 57. When in operative position, the mold is arranged to be locked up to the lower face of the press-box, (designated 62 and shown as a whole in front elevation in Fig. 5, in transverse section in Fig. 6, and in longitudinal section in Fig. 4.) This press-box is arranged to roll on a pair of longitudinal beams 63, secured at the sides of the framework, which are provided at their upper sides with rail-straps 64, on which rest rollers 65, turning on pintles 66, formed on bracket-plates 67, bolted to the sides of the press-box, and on their under side the beams 63 are likewise provided with rail-straps 68, with which engage the underrunning rollers 69, mounted to turn on brackets 70 in the same manner as the rollers 65. In addition I prefer to provide a buffer-rail 71 on the interior side of each of the beams 63, which abut against the side of the press-box 62 and prevent it from having any lateral motion. In order to adjust this rail to take up wear due to the constant sliding back and forth of the box, I also mount the rail 71 on a series of adjustable screw-stems 72, turning in threaded socket-pieces 73, mounted in the side of the beams 63, the screw-stems 72 being provided at their outer ends with heads 74, suitably formed for turning with a wrench or "tommy." The press-box 62 is thus accurately directed in its reciprocating motion backward and forward in the frame.

The press-box 62 is of rectangular form, open at both ends, as shown, being composed of two lateral side pieces 75 and front and rear side pieces 76, strongly bound together or, if desired, cast integral in metal, and in general I provide the box with a lining of sheet-copper 77, which prevents the material from becoming discolored and injuriously affected by rust if the box is made of metal and prevents the liquid portion of the material from being soaked up by the sides of the box where they are made of wood. Near the bottom of the box on its inner side the lateral sides are provided with oblique offsets 78, which narrow or choke the bore of the box, these offsets being intended to force the semi-liquid mass of raw material in the box together and compact the same just before it passes into the mold, and they serve the further additional purpose of causing the material to be more evenly distributed. Similar offsets might be formed on the front and rear sides of the box; but I prefer to omit them, as they have been found in practice to be unnecessary. The lining 77, as shown, projects slightly below the lower end of the side pieces, so as to carry the material as close as possible to the cover-plate 57 of the mold, only sufficient space being left between them for the passage of the knife 20. Around the bottom of the press-box, as shown, are provided a set of four beams 79 80, which are partly for the purpose of holding the sides of the box together against the internal pressure, but also serve other purposes, which will be hereinafter specified.

The mold is locked in place on the bottom of the press-box as follows, it being understood that this locking is such as to cause the mold to move solidly with the press-box, while at the same time being connected therewith only at the rear edge in order to permit of the passage of the knife 20 and a division-plate 81 at the rear of the knife, which will be referred to presently: The rear cross-beam 80 at the base of the press-box is provided with a plate 82, secured thereto by screws 83 or other suitable means, and which has a flap 84 projecting downwardly below the bottom of the press-box and covering the rear end of the mold when in place. This flap 84 has formed therein a pair of holes 85, in which engage guide-pins 86, projecting from the rear end of the mold. In order now to guide these pins into suitable engagements with those holes 85, I provide a pair of supplementary tracks consisting of steel bars 87, which are hinged at their rear ends, as at 88, to the lower edge of the flap 84. The rails 87 are located close to the inner sides of the beams 29 and project forwardly for a certain distance along these beams, their front ends being supported normally by longitudinal guide-brackets 89, secured to the inner sides of the beams 29. The upper edges of the rails 87 are formed with a V-shaped edge, as shown, Figs. 5 and 6, which engages with the notches 56 in the ribs 53 and 54 of the mold. The rails 87 are, as shown, not as long as the beams 29, but are shorter by an amount sufficient to leave room for the full reciprocation of the press-box, so that when the press-box reaches the front end of its travel the ends of the rails 87, which are cut obliquely, as shown at 90, will abut against the upper portion of a pair of oblique ribs 91, formed on or secured to the inner side of the beams 29. When the press-box has reached the forward extremity of its movement and a slice of compressed material has been cut off by the knife 20 in the mold 50, the latter will be ready for removal, and consequently the lever 44 will be operated to lower the beams 29, the latter then resting in the oblique position shown in dotted lines in Fig. 4, and they will preferably strike against and be supported by suitable pedestals 92, which reciprocate vertically in tubular standards 93, secured to the floor, and are supported resiliently at their lower ends within the standards by any suitable means, such as a coiled spring or air-cushion, as will be readily understood. As the beams 29 are lowered the rails 87 will fall likewise, their forward ends sliding downward against the oblique ribs 91. In this position the mold can be readily inserted in place by simply placing the rear end of it on the ways 30 and pushing it up the tracks 87, which direct it into locking engagement with the plate 84 in the manner above described. It will then be locked in this position by a pair of suitable catches 94, secured to the rails 87, which hook over the forward edge of the mold, as shown in Fig. 4. The lever 44 being then operated to raise the beams 29 up into horizontal position again, the ends of the rails 87 will be forced to slide up the ribs 91, thus raising the mold in its turn, and by this movement the catches 94 will act to force the mold into closer engagement with the plate 82, so that it is now tightly held between the plate 82 and the catches 94. In some cases I prefer to omit the ribs 91 altogether and cause the raising of the rails 87 to take place by means of the guide-brackets 89.

In the upper portion of the press-box is arranged a pressure-platen 95, which fills more or less completely the sectional area of the box and reciprocates between the upper end thereof and the offsets 78. This platen is supported when pressure is brought thereon by a pair of screw-stems 96, solidly mounted on its upper side in lugs 97 and extending through cross-beams 98, which rest in suitable recesses in the sides 75. The beams 98, if of wood, may be provided with steel strengthening-bars 99 and have each bolted thereto a steel yoke 100, in the central opening of which is mounted upon the screw-stem 96 a sprocket-nut 101, which is connected by a sprocket-chain 102 to a sprocket-wheel 103, mounted at one side of the press-box and supported therefrom by a laterally-projecting bracket 104. The sprocket-wheel 103 is keyed to a shaft which carries also a bevel-gear 105, and this bevel-gear engages with a vertical bevel-gear 106, splined to a longitudinal rod 108, which is journaled in boxes 109, secured to the side of the posts 16, and has at its front end a hand-wheel 110. By means of the splined connection the bevel-gears 106, and through their intermediate connections the sprocket-nuts 101, may be turned by operating the hand-wheel, while at the same time the bevel-gears 106 slide freely on the rod 108, being maintained in proper engagement with the gears 105 by their mountings in upwardly-projecting ears 111, formed on the brackets 104. It will be seen, therefore, that by turning the hand-wheel 110 the platen 95 is depressed to force the material in the press-box down upon the mold, this operation being continuously performed as the sheets are taken out without stopping the machine.

In order to provide for filling the press-box, the beams 98, carrying the platen and other parts, are hinged at one side, as at 112, to the side of the press-box, and at their other ends they are provided with suitable latches 113, which engage under a catch-rod 114, so that when it is desired to fill the press-box the whole of the platen and connected parts may be simply turned over, leaving the top of the box open.

The material in the press-box being under constant pressure, it is necessary to provide some means of support for said material during the time that the mold is being removed and another one substituted, at which time the beams 29 are lowered, and consequently the sustaining force removed from the bottom of the box. For this purpose I provide the division-plate 81, which is sufficiently wide to completely cover the lower end of the box, as shown in Fig. 5, this division-plate being preferably formed to interlock with the rear edge of the knife by a scarf-joint formed by a rectangular groove 115 in the back of the knife interlocking with a similar groove formed on the under side of the division-plate, Fig. 4. This division-plate is adjustably secured to the frame of the machine by a pair of bolts 116, which have one end flattened and formed with an eye through which passes a bolt 117, secured to the front end of the division-plate, while the other end of each bolt 116 passes through a hole in a crossbar 118, secured to the posts 16, and the bolt 116 is adjusted and clamped in position by lock-nuts 119. By this construction the knife is protected against being pulled backwardly by the press-box on its backward movement, and to prevent undue sagging of the knife beneath the press-box during the time the mold is removed I preferably arrange a pair of clips or fingers 81ᵃ, which project from the lower face of the division-plate at each side thereof and take under the knife, so as to support the same.

The division-plate 81 is provided on its upper side with two pairs of single-shaped overhanging guide-ribs 120, which serve the purpose not simply of strengthening the plate against transverse bending forces or endwise-compression forces, but also of interlocking it with a pair of longitudinal T-bars 121, which project below the bottom of the press-box and are secured thereto by a set of vertical bolt-rods 122, which have nuts 123 at their upper ends resting on plates 124. The forward ends of the T-bars 121, which project below the bottom of the press-box and are secured thereto by a set of vertical bolt-rods 122, which have nuts 123 at their upper ends resting on plates 124. The forward ends of the T-bars 121 engage at all times between the angular ribs 120, and when the press-box is in its forwardmost position the division-plate is completely locked and secured to the bottom of the press-box, so as to support the material therein against the pressure of the platen 95 during the time that the mold is being changed. Furthermore, in order to further strengthen the connection between the division-plate and press-box, as well as to rigidify the former and prevent it from lateral motion, I may secure on the under side of the beams 79 longitudinal grooved bars 125, which engage with offset flanges 126, formed on the lateral edges of the division-plate, as shown in Figs. 5 and 9.

I will now describe the apparatus shown by which the press-box 62 and the mold attached thereto are given a reciprocating movement along the beams 29 and 63.

Across the front of the machine is journaled a shaft 127 in suitable journal-boxes 128, fixed to the transverse beam 27, and on this shaft are fixed a series of flanged drums 130, shown as three in number. To each of these drums is secured, as by pins 131, one end of one of the cords or wire ropes 132 133, the opposite end of the under rope 132 (which is attached to the central drum 130) being secured to a ring 134, fastened to the front beam 80 of the press-box, passing through a hole 135 in the beam 27. The upper cords 133 (attached to the side drums 130) pass through pipes 136, resting on the side beams 63, and pass around sheaves 137, mounted in hangers secured to the transverse beam 28 at the rear of the machine, and the ends of the cords 133 are secured to eyes 140 on opposite ends of a whiffletree 140ᵃ, which engages with an eye 141, mounted on the beam 80 at the rear of the press-box. By this connection it will be seen that the rotation of the shaft 127 in one direction causes the press-box 62 to be moved forward and in the opposite direction to be moved back. For rotating the shaft 127, one of which is provided independently for each machine unit, a sprocket-wheel 141 is keyed to one end of the shaft, which is connected by a chain 142 with another sprocket-wheel 143, keyed to a short jack-shaft 144, journaled in a sliding block 145, which is mounted in a hammer-yoke 146, so as to have a short transverse sliding movement. Adjacent to the shaft 144 and at right angles thereto is a power-shaft 147, supported in hangers 148 and having a number of pulleys 149 150 151 thereon, as may be required. As shown in Fig. 2, one of the pulleys 149 has a belt 152, which runs over a pulley 153, which serves to turn a similar power-shaft 154, which operates a second machine unit at the right hand of Fig. 2 and which is otherwise similarly arranged to the shaft 147. The pulley 150 is the driving-pulley of the entire machine and is operated by means of a power-belt 155. The pulley 151 serves to operate the band-knife, being connected by a belt 156 to the pulley 157 on the shaft 158 of one of the pulleys 21, as described.

On the forward end of the shaft 147, as also of the shaft 154, are fixed two bevel-gears 159 160, which face each other and are arranged to alternatively engage with a bevel-gear 161, mounted on the adjacent end of the jack-shaft 144. It will be obvious that the jack-shaft may be made to turn in either direction, according to the engagement of the gear 161 with one or other of the gears 159 and 160, correspondingly altering the direction of motion of the press-box 62. This change is brought about by a shifting lever 162, which is pivoted at 163 on the bracket 164, secured to the adjacent post 16, and which is connected at its upper end to the sliding block 145, as shown, and the lower end of the lever 162 may be made in the form of a handle 165, to be operated by hand as the press-box reaches either extremity of its travel; but I prefer to arrange it to be operated automatically by the press-box itself to throw the gear 161 out of engagement with the gears 159 160 at each end of its travel, and thus to automatically stop the motion of the press-box. This may be done in a number of ways, of which that illustrated in the drawings is an example. In this case I arrange a longitudinal shifting rod 166, supported by straps 167 on the side of the posts 16 and having at its front end a pin 168, which engages in a slot 169 in the lower end of the lever 162. On the rod 166 are adjustably clamped two collars or dogs 170 171, which are engaged, respectively, at the forward end and rear extremities of the travel of the press-box. It will be seen that in either case the gear 161 is automatically thrown out as soon as the press-box has reached the end of its travel, and, if desired, the arrangement may be such that it is thrown into gear with the opposite gear-wheel, and thus the press-box kept reciprocating continuously in opposite directions; but this would not be desirable at the forward reach, for time must be given for the exchange of molds.

In order to keep the knife continually sharp, I arrange an emery-wheel 173, mounted on an overhanging shaft 174, secured to one of the brackets 25, as shown in Fig. 2, there being on the shaft of the emery-wheel a pulley 175, over which passes a belt 176, which passes likewise over guide-pulleys 177, mounted on brackets 178 at the rear of the machine and likewise over a driving-pulley 179, mounted on a short transverse jack-shaft 180, journaled in a hanger 181 adjacent to the shaft 147 and carrying on its end next to said shaft a bevel-gear 182, which engages with another bevel-gear 183 on the end of the shaft 147. This emery-wheel being run in constant contact with the knife keeps it constantly sharp, the knife resting thereon by its own weight; but as it is desirable to steady the knife, and thus produce a straighter and evener edge thereon, I prefer to provide an adjustable guide-block 184 for said knife, which is shown in detail in Fig. 16. This guide-block is supported in a grooved bracket 185, mounted on the side of the frame of the machine, and has on its front edge a groove 186, through which the knife passes and which holds it in proper position for the action of the emery-wheel, and said groove 186, as shown, has a gouge or recess 187 in the center thereof through which the edge of the emery-wheel 173 passes, the block 184 being adjustable in position by means of a pair of set screws or bolts 188, which are threaded into sockets in the bracket 185. It will be understood that while I have shown this wheel on the upper lap of the knife at the point at which it issues from the press-boxes still it may be mounted at any point thereon, as may be most convenient, and, moreover, in cases where a large number of units are used, all mounted side by side and served by the same knife, I propose to have several emery-wheels located at regular intervals between the units, so that the knife cannot possibly become dull from having to cut too great an amount of material before being resharpened.

I prefer to provide for keeping count of the amount of work done by the machine a registering device, consisting of a dial 189, provided with a hand which is advanced through one number of the register each time the press-box reaches the forward limit of its travel. The press-box is provided with a forwardly-projecting trip 190, mounted on the side thereof, which engages with a pawl-lever 191, which is loosely mounted on the lower end of the operating-shaft 192 of the dial, which has keyed to its lower end below the lever 191 a ratchet-wheel 193, acted on by a pawl 194, mounted on the lever. The pawl-lever is normally held in its rearmost position by a spring or other convenient arrangement and at each advance of the press-box is struck by the trip 190 and caused to advance the ratchet-wheel 193 through a distance of one tooth, thus operating the register.

The operation of this machine is in general as follows: Supposing the press-box 62 to be filled with raw material, comprising a mixture of well-soaked and preferably finely-shredded leather-scrap and paste or other adhesive, the whole being in a viscous state, the cover of the press-box is put on and the platen depressed by operating the handle 110. During this time unless the mold is in proper place the press-box should be at the front end of its movement, so that its bottom is covered by the division-plate 81, the beams 29 being in lowered position. The mold having a sheet 59 of flexible material, as already described, spread thereover and covered by the cover-plate 57, is pushed up the ways until caught and locked by the catches 94, whereupon the lever 44 is brought forward and the toggle-joint 38 straightened, raising the beams 29 and clamping the mold solidly in position, as above said. The shifting lever 162 is now pulled forward to the limit of its movement, which causes the gear 161 to become engaged with the gear 160, whereupon the shaft 127 is set rotating and the press-box returned to the opposite extremity of its travel, when the bracket 172 strikes the dog 171, which brings the press-box to a stop. The hand-wheel 110 is now operated to depress the platen 95 by a distance equal to the thickness of the recess in the mold, whereupon the lever 162 is again shifted to bring the press-box forward again. On its forward movement the knife 20, being moved at a rapid rate, rapidly cuts through the material, leaving a sheet or layer thereof in the mold and permitting the excess in the press-box to pass over the knife and to be supported by the plate 81. The beams 31 are then lowered, the mold taken out and replaced by another, which is prepared by another operative and stands ready for use, which is again pushed into the machine, the beams 29 raised, and the operation repeated. The register 189 records accurately the number of sheets which have been turned out.

In Figs. 14 to 22, inclusive, I have shown the elements of my invention as it may be carried out by hand. These figures also illustrate clearly the successive steps of the process from the raw material to the finished molded sheet. In Fig. 15 is shown a plain mold-box 50' of the form in common use, having a rectangular recess 52 in its upper side of the shape of the finished sheet; but on one side of the face of the mold I provide two small projecting pins 243, which subserve the purpose to be hereinafter referred to. With this mold corresponds a rectangular frame or box 62', called herein the "molding-box" and corresponding with the press-box 62 in the first machine above described, and, further, a pressure plate or platen 95', having a handle 96' of suitable form, by which pressure may be exerted thereon. At 81', Fig. 16, is shown a division-plate which has at one end two small holes 244, corresponding in position to the pins 243, so that when the division-plate is placed on the mold it is held in proper position thereon by these pins. The outfit is completed by a knife 20', which is adapted to cut off the superfluous material in the same manner as the band-knife 20, shown in the machine previously described. The operation as performed with this outfit would be about as follows: The mold-box 62' is placed over the mold, the opening in its lower side being of the same dimensions as the recess 52. The leather paste 61' is then placed in the mold-box and suitably distributed therein and may, if desired, be worked around with the hands or a tamping implement; but ordinarily this is not necessary. It is merely desirable to have the upper surface of the material fairly level. The pressure-platen 95' is now inserted, as in Figs. 14 and 17, and pressure brought to bear thereon, as in Fig. 18, whereupon the knife 20' is caused to pass between the mold-box and the mold, as shown in Figs. 17 and 18, thus clearly cutting off the portion of the stock which lies in the recess 52. The next operation is to pass the division-plate 81' between the box and the mold in the same manner as the knife has previously been passed, and one of the longitudinal edges 81$^a$ is preferably sharpened for this purpose, as shown in Figs. 16 and 22, and may, in fact, if desired, be made to perform the function of cutting, so that the knife 20' may be dispensed with. The division-plate 81' being passed beneath the mold-box, so as to support the material therein, the latter may now be lifted off and the material in the mold-box dumped out into the receptacle which contains the stock. The next operation is to place over the cut sheet in the mold the covering 59, being the same as that already described in connection with Figs. 10 and 11 and comprising the leather skiving or piece of brown paper or any suitable material. The next operation is to place the division-plate 81' on top of the mold, the two pins 243 fitting in their sockets 244, whereupon the plate being held against the face of the mold the whole may be inverted and the mold removed, leaving the plate 81', the covering 59, and the cut sheet 61$^a$ in the position shown in Fig. 20. The next operation is to fold the covering 59 over the sheet, as shown in Fig. 21, when the material is ready for pressing; but I have found it to produce superior results to wrap the unpressed sheet, as shown in Fig. 21, in a covering of strong fabric, such as canvas or burlap 245, before pressing, as this sheet holds the press in proper form and prevents it from unduly spreading or becoming weak at the edges.

While I have described above the exact steps and materials by which my process is preferably carried out, still it will be understood by those skilled in the art that these are merely given by way of example and that certain modifications and variations may be resorted to and the non-essential steps of the process omitted so far as lies within the scope of the following claims.

Having thus described my invention, what

I claim as new, and desire to secure by Letters Patent, is—

1. The process of making pasted leather-stock, which consists in overfilling a mold therewith, cutting away the superfluous portion of the stock above the face of the mold, wrapping the molded sheet in a covering, wrapping the covered sheet in a covering of rough fabric, and subsequently compressing the same.

2. The process of making pasted leather-stock, which consists in overfilling a mold with said stock, confining the material above said mold, compressing the material so confined, severing the stock immediately over the surface of the mold while the material is under compression, passing a plate between the two severed portions in the rear of the severing means, wrapping the molded material in a sheet of covering material, enveloping the whole in coarse fabric, and subjecting the sheet to pressure.

In witness whereof I have hereunto set my hand in the presence of two witnesses.

PHILIAS BELLE.

Witnesses:
J. A. MARION,
T. MYNARD.